Nov. 29, 1927.  
C. G. RONSHEIMER  
1,651,293  
DEHYDRATOR  
Filed Feb. 18, 1927  
2 Sheets-Sheet 2
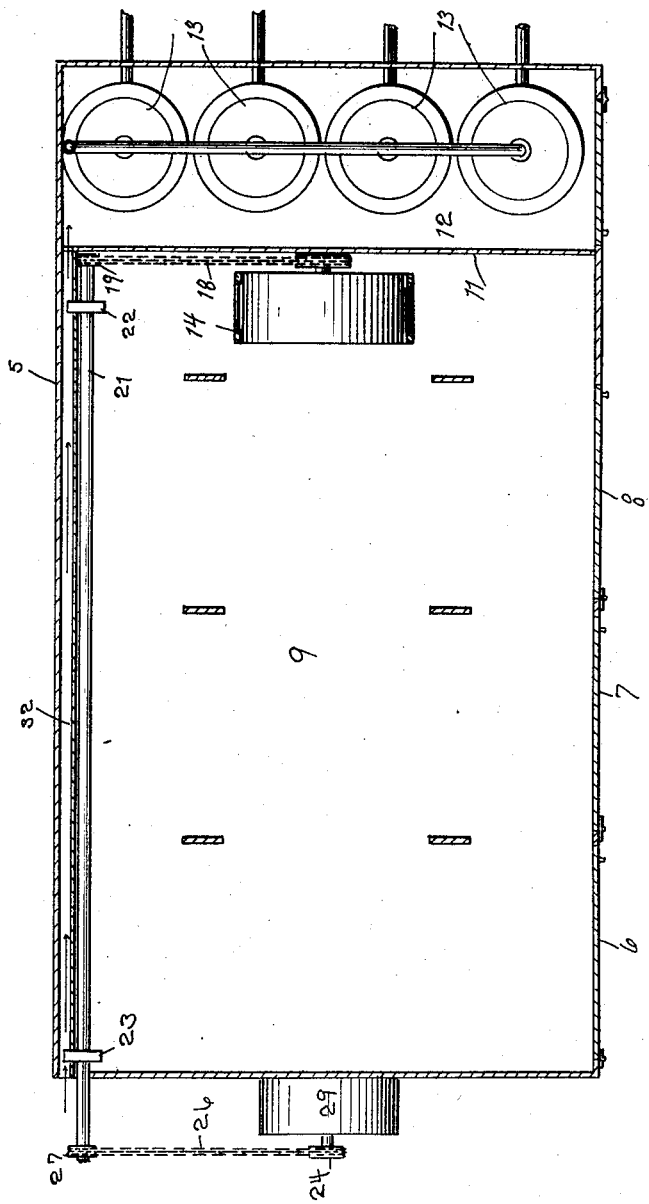
*Fig. II.*
INVENTOR.  
C. G. RONSHEIMER  
BY *Victor J. Evans*  
ATTORNEY.

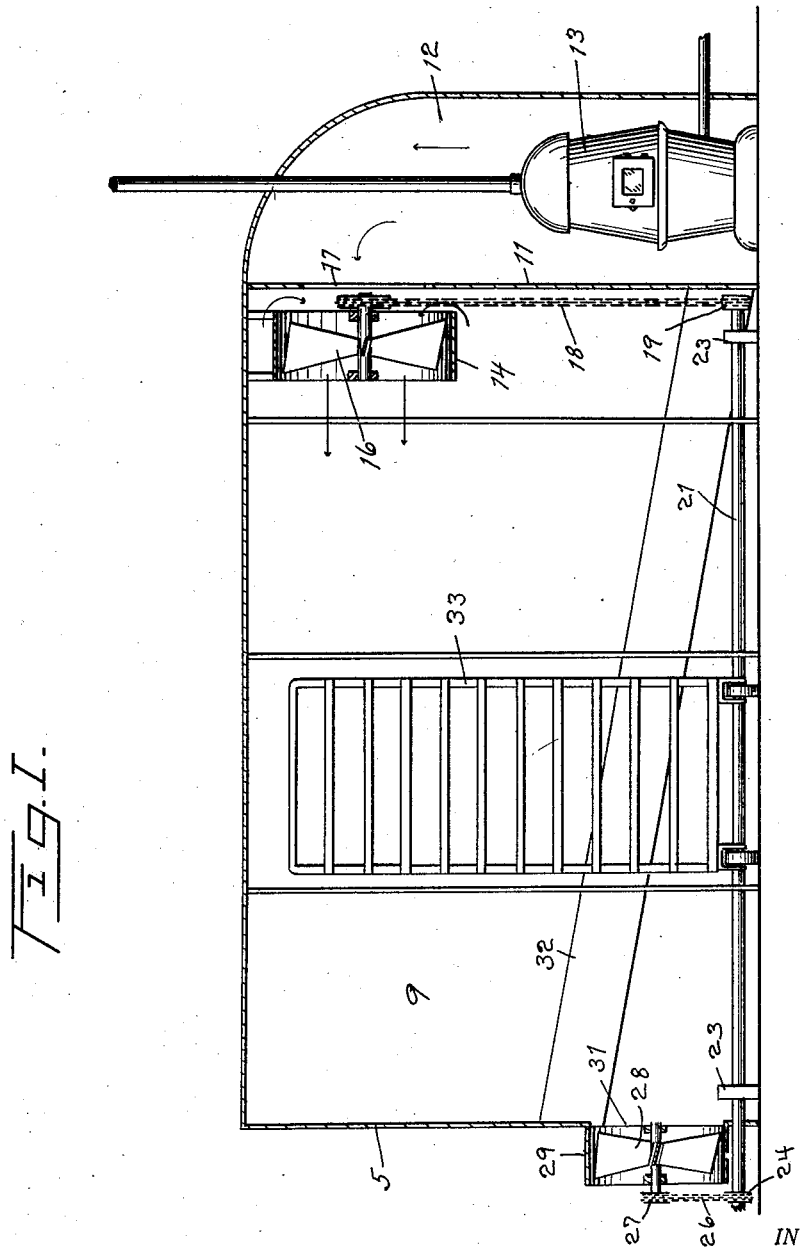

Patented Nov. 29, 1927.

1,651,293

UNITED STATES PATENT OFFICE.

CHARLES GLENN RONSHEIMER, OF PENNGROVE, CALIFORNIA.

DEHYDRATOR.

Application filed February 18, 1927. Serial No. 169,366.

This invention relates to improvements in dehydrators and has particular reference to means for securing a more even drying condition in a dehydrator plant.

The principal object of this invention is to produce a dehydrator which can be constructed more economically than the ordinary dehydrator plant.

A further object is to provide means whereby the drying condition will exist in all parts of the dehydrator plant in counterdistinction to many plants in which cold air pockets are formed, where practically no circulation takes place, and therefore the drying does not progress.

Other objects and advantages will be apparent during the course of the following description.

In the accompanying drawings forming a part of this specification and in which like numerals are employed to designate like parts throughout the same, Figure 1 is a vertical cross section of my dehydrator plant showing a drying rack placed within the same, and Figure 2 is a top plan view of my dehydrator.

At the present time it is common to construct dehydrator plants the same, usually consisting of thick wall buildings having a series of racks therein and doors through which the racks may be removed. In most of these plants hot air is merely introduced at one end of the plant and allowed to pass over the fruit and then discharged at the other end of the plant. This results in an uneven drying, due to the fact that the heated air at the point of entry causes a quick drying of the fruit, while the air at the far end of the plant is moisture laden and therefore this does not dry with the same degree of rapidity as at the other end, the consequence is that it is necessary in this type of plant to move the fruit from time to time with considerable loss of heat due to the opening of the doors.

In my improved plant, I overcome this trouble by combining two blowers of different capacity and by so arranging them that a pressure is built up within the dehydrator plant, and further arranging them so that one of the fans causes a re-circulation of the portion of the air within the plant.

In the accompanying drawings wherein for the purpose of illustration is shown a preferred embodiment of my invention, the numeral 5 designates the wall of the dehydrator having doors 6, 7 and 8, which give access to the drying chamber 9. The partition 11 serves to close off a portion of the plant so as to form a heating chamber 12, within which a plurality of stoves 13 may be placed. These stoves may take any desired form, but I prefer to use gas for the purpose of heating the same, because of the fact that the heat may be so readily controlled. Suspended or otherwise positioned within the drying chamber 9 is a fan housing 14 within which a fan 16 is positioned. This fan is adapted to draw heated air from the chamber 12 through an opening 17, in the partition 11. It will be noted by viewing Figure 1, that this opening is of less area than the vertical cross sectional area of the fan housing 14. The fan 16 is rotated through the medium of a chain 18 which passes over a sprocket 19, carried upon a shaft 21. This shaft 21 is suitably journaled in bearings 22 and 23. At 24, I have shown a sprocket over which a chain 26 passes to a sprocket 27. This sprocket is adapted to drive the shaft of a suction fan 28 mounted in a fan housing 29. The capacity of the fan 28 is considerably less than the capacity of the fan 16, the purpose of which will be later seen.

The shaft 21 may be driven in any suitable manner as by a motor positioned at any convenient point. The opening 31 permits the fan 28 to exhaust air from within the chamber 9. At 32 I have shown a conduit through which air may be drawn from the outer atmosphere, and delivered to a point adjacent the bottom of the heating chamber. This air in passing through the conduit receives a pre-heating from the heated wall of the drying chamber.

Fruit to be dried is placed upon racks preferably mounted upon casters and moved through the doors of the drying chamber so as to assume the position of the rack 33 of Figure 1.

The theory of operation of the dehydrator is as follows:

Assuming that the required number of racks having fruit thereon have been placed in the drying chamber by passing the racks through the doors, 6, 7 and 8, and that the stoves 13 have been lit so as to give off heat therefrom, the motor connected to the shaft 21 started, the result will be that the fan 16 will draw heat from the heating chamber 12 through the opening 17 and expel the same into the drying chamber. At the same time the fan 28 will tend to exhaust this air from within the drying chamber, but as the same has a capacity less than the fan 16, a pressure will be built up within the drying chamber. This building up of the pressure will result in the fan 16, causing a circulation of air within the drying chamber and due to the fact that the opening 17 is of less size than the vertical cross section area of the fan casing 14, a certain portion of the air within the drying chamber will be re-circulated as indicated by the arrows adjacent this fan. Consequently due to the circulation there will be no cold pockets and the same temperature and humidity conditions will exit throughout the entire drying chamber. Fresh air will be drawn into the heating chamber through the conduit 32 at a rate equal to that in which the air is exhausted by the fan 28.

It will thus be seen that I have produced a dehydrator which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a dehydrator, a drying chamber, a heating chamber, a partition positioned between said drying chamber and said heating chamber, a plurality of stoves positioned within said heating chamber, means for conducting air to said heating chamber, a fan positioned within said drying chamber, said fan being spaced from said partition, said partition having an opening formed therein at a point adjacent said fan, the opening of said partition being of smaller area than the vertical cross sectional area of said fan and a second fan of smaller capacity than said first mentioned fan and remotely positioned with respect to said first mentioned fan and adapted to exhaust air within said drying chamber.

In testimony whereof I affix my signature.

CHARLES GLENN RONSHEIMER.